United States Patent [19]

Nanba et al.

[11] 4,040,068
[45] Aug. 2, 1977

[54] EXPOSURE TIME CONTROL DEVICE FOR AN ELECTRIC SHUTTER IN A SINGLE REFLEX CAMERA WITH THROUGH THE LENS MEASURING SYSTEM

[75] Inventors: Yasuhiro Nanba, Toyokawa; Masayoshi Sahara, Sakai, both of Japan

[73] Assignee: Minolta Camera Kabushiki Kaisha, Osaka, Japan

[21] Appl. No.: 586,704

[22] Filed: June 13, 1975

Related U.S. Application Data

[63] Continuation of Ser. No. 315,211, Dec. 14, 1972, Pat. No. 3,931,628, which is a continuation of Ser. No. 131,151, April 5, 1971, abandoned.

[30] Foreign Application Priority Data

Apr. 6, 1970  Japan .................................. 45-28599

[51] Int. Cl.² ................................................ G03B 7/08

[52] U.S. Cl. ........................................ 354/24; 354/50; 354/51; 354/60 R

[58] Field of Search .................... 354/23 R, 24, 31, 48, 354/50, 51, 60 R

[56] References Cited

U.S. PATENT DOCUMENTS

| | | | |
|---|---|---|---|
| 3,670,637 | 6/1972 | Mori et al. | 354/24 |
| 3,852,774 | 12/1974 | Taguchi et al. | 354/24 |

Primary Examiner—Russell E. Adams
Attorney, Agent, or Firm—Watson, Cole, Grindle & Watson

[57] ABSTRACT

A control device for controlling the exposure time automatically for an electric shutter, in a single reflex camera of the so-called "through the lens" photometric type which determines the brightness of an object by means of the light past through the projection lens of a camera.

11 Claims, 9 Drawing Figures

EXPOSURE TIME CONTROL DEVICE FOR AN ELECTRIC SHUTTER IN A SINGLE REFLEX CAMERA WITH THROUGH THE LENS MEASURING SYSTEM

This is a continuation of application Ser. No. 315,211 filed Dec. 14, 1972, now U.S. Pat. No. 3,931,628 which is a continuation of application Ser. No. 131,151, filed on Apr. 5, 1971 and now abandoned.

BACKGROUND OF THE INVENTION

This invention relates to an exposure time control device for an electric shutter.

In a single reflex camera of the "through the lens" photometric type, it is impossible to determine the brightness while the shutter is in operation. Thereupon, it has been proposed that all the while the shutter is in operation the brightness value of a photoconductive element at the time just before said shutter is operated is memorized and the exposure time is controlled automatically on the strength of said memorized value.

In such a proposition, after applying a logarithmic compression by producing the output voltage proportional to the logarithmic value of the illuminance on the light receiving surface of a photoconductive element, by means of a circuit in which photographic conditions such as setting diaphragm value, film sensitivity, etc. are set up as a bias voltage, said output voltage applied with said logarithmic compression and the bias voltage are operated photographically to allow a condenser to memorize the proper exposure time, and the memorized voltage in said condenser is applied with an inverse logarithmic conversion again to effect the automatic exposure control. And accordingly, it has the advantage of that it is possible to allow a memory condenser to memorize covering all sphere of the brightness of an object in a wide range, however, said memorized voltage is applied with a logarithmic compression so that if there should be a small error therein, in the process for applying an inverse logarithmic conversion said small error is enlarged resulting in a broad error in the exposure time.

Especially in such a proposition, behind the circuit for applying the logarithmic compression there is provided the circuit for setting up photographic conditions such as diaphragm value, film sensitivity, etc. as the bias voltage, so that in respective circuit it is necessary to do the voltage compensation and temperature compensation, and yet if this is imperfect an error which is not negligible may come out in the exposure time.

Anyway, in this manner giving the voltage compensation and the temperature compensation to respective circuit results in a very complex circuit as a whole and yet the perfect compensation can not be expected.

On the other hand, in such a circuit the exposure control is effected by an electromagnet, and while the coil of said electromagnet is in operation a large current runs therethrough so that the voltage variation of power source before and after the shutter operates is remarkable. Therefore, at the photometric time when the electromagnet coil is not operated, even though the illuminance on the light receiving surface of a photoconductive element is memorized by compressing so as to be in proportion to its logarithmic value, the power source voltage undergoes a change at the shutter operating time when the electromagnet coil is operated, therefore, when the memorized voltage memorized by compressing is applied with the inverse logarithmic conversion, on account of said voltage variation of power source an exposure control error which is not negligible comes out, and this fact stands in the way to put such a proposition to practical use.

SUMMARY OF THE INVENTION

The present invention relates to an exposure time control device in a single reflex camera with "through the lens measuring system", which is characterized in that a portion for producing the output voltage proportional to the logarithmic value of the illuminance on the light receiving surface of a photoconductive element and a bias portion for converting the setting diaphragm and the film sensitivity are connected in series to each other and said series connected body is connected to the constant-current circuit formed by one and the same power source so as to do the photographic operation, and the output voltage applied with said operation and proportional to the logarithmic value of the exposure time is memorized in a memory condenser and said memorized voltage is applied with an inverse logarithmic conversion by means of a transister for the inverse logarithmic conversion in an exposure control circuit and impressed in a time constant circuit for reversing a switching circuit.

The object of the present invention is to provide an exposure time control device in a single reflex camera with "through the lens measuring system", which effects the high precision exposure time control by memorizing the output voltage applied with a logarithmic compression proportional to the logarithmic value of the exposure time in a photometric circuit based on the photometry prior to the exposure and preventing an error to intervene into the memorized voltage in the case of that a time constant circuit for reversing a switching circuit by applying an inverse logarithmic conversion is put in operation.

Another object of the present invention is to provide an exposure time control device in a single reflex camera with "through the lens measuring system", which in order to attain the aforementioned object looks for the output voltage proportional to the logarithmic value of the illuminance on the light receiving surface of a photoconductive element and the bias voltage for converting the setting diaphragm value and the film sensitivity by means of one and the same electric power source to operate them photographically so as to allow a memory condenser to memorize its output voltage proportional to the logarithmic value of the exposure time.

Further another object of the present invention is to provide an exposure time control device in a single reflex camera with "through the lens measuring system", which operates the exposure time control circuit by applying an inverse logarithmic convertion to the memorized voltage by means of said electric power source.

Furthermore another object of the present invention is to provide an exposure time control device in a single reflex camera with "through the lens measuring system", which effects the high precision exposure time control by doing the pressure compensation for said electric power source and especially preventing the power source voltage to vary in the case of that a logarithmic compression and an inverse logarithmic conversion are applied, regardless of ON or OFF of electrification of the electromagnet coil in the exposure time control circuit.

The other object of the present invention is to provide an exposure time control device in a single reflex camera with "through the lens measuring system", in which the temperature compensation is facilitated by giving a temperature change to the constant-current of the constant-current circuit and effecting simultaneously the temperature compensation for the portion for generating the output proportional to the logarithmic value of the illuminance on the light receiving surface of the photoconductive element and the bias portion by means of the constant-current circuit formed by one and the same power source.

DESCRIPTION OF THE PREFERRED EMBODIMENT

Figure 1:
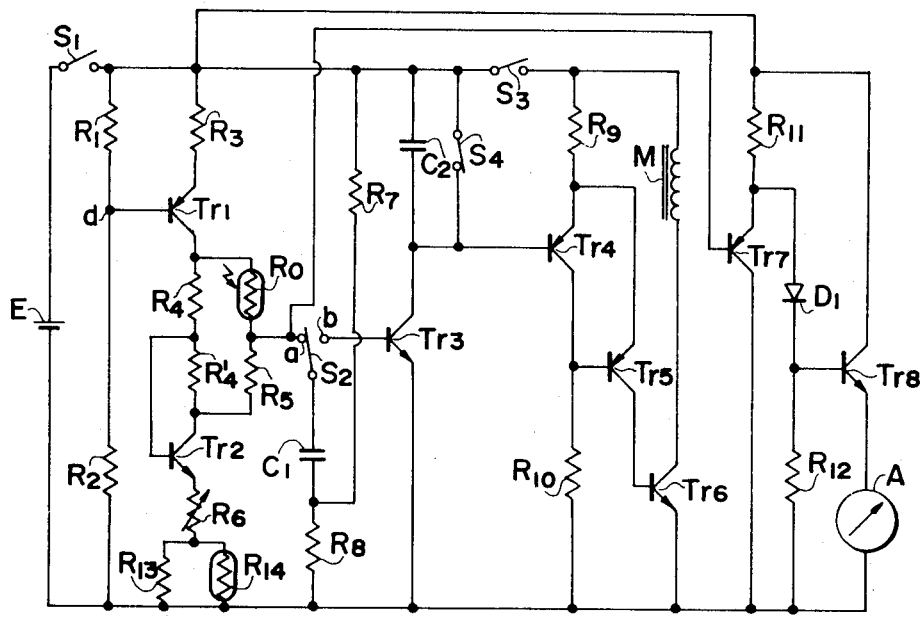
FIG. 1 is a circuit diagram of the control circuit in the exposure time control device in a single reflex camera with "through the lens measuring system" in accordance with the present invention.

With reference to the drawings the present invention will be described hereinafter. FIG. 1 shows an example of the control circuit, wherein to power source E and power source switch $S_1$ resistance $R_1$ and resistance $R_2$ are connected in series, and connection point $d$ thereof is connected to the base of constant-current transistor $Tr_1$. To the collector of said transistor $Tr_1$ the series connection body of composite photoconductive element $R_o$ and relative resistance $r_5$, and the series connection body of resistances $R_4$ and $R'_4$ in parallel therewith are connected, which are connected also to the collector of temperature compensation transistor $Tr_2$, and said resistance $R_4$ is connected between the base and the collector of said temperature compensation transistor $Tr_2$ and the emitter thereof is connected to the negative side of power source E through variable resistance $R_6$ for converting the film sensitivity and the set up diaphragm value, and the parallel connection body of fixed resistance $R_{13}$ and thermistor $R_{14}$.

Figure 2:
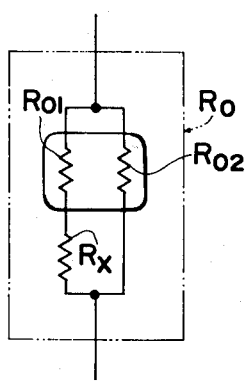
FIG. 2 is a circuit diagram of the composite photoconductive element in the embodiment shown in FIG. 1.

Said composite photoconductive element $R_o$ is composed of photoconductive element $R_{o1}$ and fixed resistance $R_x$ connected in series to each other, and photoconductive element $R_{o2}$ connected in parallel therewith as shown in FIG. 2.

To change over switch $S_2$ switchable to one contact a which is a connection point between said composite photoconductive element $R_o$ and relative resistance $R_5$ and the other contact b, memory condenser $C_1$ is connected, and to the other end of said condenser there are connected resistances $R_7$, $R_8$ for power source voltage drop bias which are respectively connected to the positive and negative sides of the power source.

Figure 3:
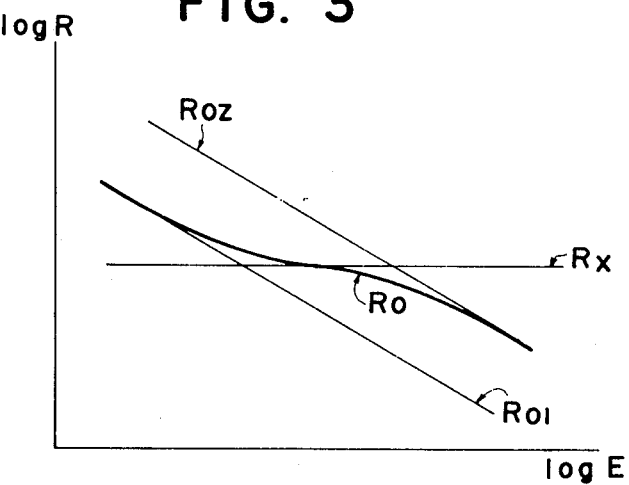
FIG. 3 is a diagram showning the resistance characteristic to the logarithmic value of the illuminance on the light receiving surface in said composite photoconductive element.
Figure 4:
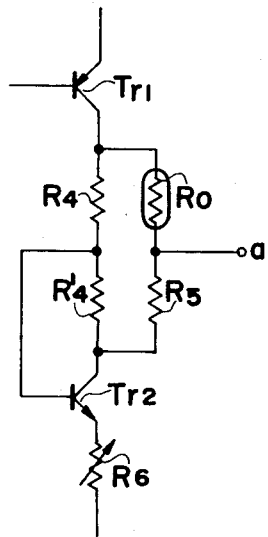
FIG. 4 is a partial circuit diagram of the photometric circuit including said composite photoconductive element.
Figure 5:
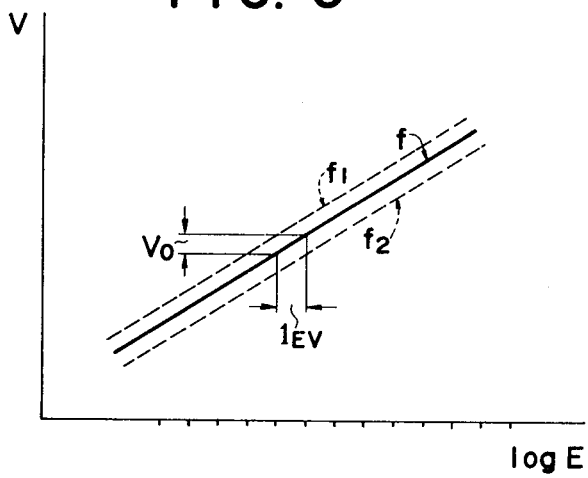
FIG. 5 is a diagram showning the relation between the potential at contact a and the illuminance on the light receiving surface in the circuit shown in FIG. 4.

Said photoconductive elements $R_{o1}$, $R_{o2}$ forming composite photoconductive element $R_o$ have characteristics shown in FIG. 3 for the logarithmic value of the illuminance on the light receiving surface, and the logarithm of its resistance value is inversely proportionate to the logarithm of the illuminance on the light receiving surface as shown by straight lines $R_{o1}$ and $R_{o2}$. On the other hand, fixed resistance $R_x$ is constant relative to the logarithm of illuminance on the light receiving surface as shown by straight line $R_x$, so that the logarithm of the combined resistance value of composite photoconductive element $R_o$ has the characteristic shown by $R_o$ to the logarithm of the illuminance on the light receiving surface. And, in the case of that to composite photoconductive element $R_o$ having the resistance characteristic of the illuminance on the light receiving surface as shown in FIG. 3 relative resistance $R_5$ is connected in series as shown in FIG. 4, and the collector current of constant-current transistor $Tr_1$ is a constant-current, the relation between the potential (volt) at contact a of the connection point thereof and the illuminance on the light receiving surface is as shown by straight line $f$ in FIG. 5, and the potential at contact a is applied with a logarithmic compression to the illuminance on the light receiving surface, and for a change of one step (1 EV) of the illuminance on the light receiving surface, $V_o$(volt) and Vo (volt) undergoes a change. Therefore, by connecting variable resistance $R_6$ for converting the setting diaphragm and the film sensitivity in series to relative resistance $R_5$ and changing said variable resistance $R_6$, it is possible to move the potential at contact a in parallel like straight lines shown by $f_1$, $f_2$.

Therefore, when change over switch $S_2$ is connected to contact a to put a photometry into practice and the illuminance on the light receiving surface is applied with a logarithmic compression by composite photoconductive element $R_o$ and relative resistance $R_5$ to be memorized in condenser $C_1$, before the shutter is operated and before the illuminance on the light receiving surface of composite photoconductive element $R_o$ is not yet changed said change over switch $S_2$ is changed over from contact a to contact b.

Transistor $Tr_3$ the base of which is connected to contact b is a transistor for applying an inverse logarithmic conversion to the memorized voltage memorized in condenser $C_1$ by the logarithmic compression, and to condenser $C_2$ connected to the collector of said transistor $Tr_3$ the constant current proportional to the illuminance on the light receiving surface of composite photoconductive element $R_o$ can be charged by opening trigger switch $S_4$ provided in parallel with said condenser $C_2$.

Main switch $S_3$ is closed after change over switch $S_2$ is disconnected from contact a, and excites electromagnet coil M. Trigger switch 4 is shut off simultaneously with the opening operation of the shutter.

Transistors $Tr_4$, $Tr_5$, $Tr_6$ forms a switching circuit composed of a Schmidt circuit, and when main switch $S_3$ is closed transistors $Tr_5$, $Tr_6$ are electrified to excite electromagnet coil M and lock the shutter from closing.

Just as trigger switch $S_4$ is shut off simultaneously with opening of the shutter, the voltage in memory condenser $C_1$, which is the result of, as described above, the voltage applied by the logarithmic compression to the illuminance on the light receiving surface of composite photoconductive element $R_o$ and the voltage for converting the set up diaphragm value and the film sensitivity photographically operated, is applied with an inverse logarithmic conversion, and the constant current corresponding to the setting diaphragm value and the illuminance on the light receiving surface, and proportional to the illuminance on the light receiving surface at the time just before the shutter is operated is charged to condenser $C_2$, so that it is possible to control the proper exposure time in accordance with the brightness of an object, the setting diaphragm value, and the film sensitivity.

A denotes an ammeter which indicates the proper exposure time answered in accordance with the setting diaphragm value, the film sensitivity and the brightness of an object by amplifying the potential at contact a at the photometric moment by means of transistors $Tr_7$, $Tr_8$. Diode $D_1$ connected between the collector of said transistor $Tr_7$ and the base of said transistor $Tr_8$ is a diode for compensating the temperature.

In the present invention formed as described above, in order to effect the temperature compensation to transistor $Tr_3$ for the inverse logarithmic conversion, resistance $R'_4$ is connected between the collector and the base of temperature compensation transistor $Tr_2$ having the same characteristic as that of transistor $Tr_3$ for the inverse logarithmic conversion, and the other end of fixed resistance $R_5$ connected in series to photoconductive element $R_o$ is connected to the collector of temperature compensation transistor $Tr_2$, and by using the voltage at the connection point on the collector side of said transistor $Tr_2$ as a bias of output terminal a and making use of the fact that the difference between the voltage of output terminal a corresponding to the resistance value of photoconductive element $R_o$ and the base voltage of temperature compensation transistor $Tr_2$ is proportional to collector current $Ic2$ of said transistor $Tr_2$, the temperature coefficient of the bias voltage of output terminal a and the temperature coefficient of the collector current of said transistor $Tr_2$ are adapted to correspond to the temperature coefficient of transistor $Tr_3$ for the inverse logarithmic conversion so as to effect the temperature compensation to transistor $Tr_3$ for the inverse logarithmic conversion covering a wide extent of collector current $I_{c3}$, and thereby an error which is not negligible in the inverse logarithmic conversion process is removed and the high precision automatic control for the exposure time can be effected covering all sphere of the illuminance on an object in a wide range.

The aforementioned fact will be described in the concrete hereinafter using formulas.

The relation between the base voltage $V_{BE3}$ of transistor $Tr_3$ for the inverse logarithmic conversion and the collector current $I_{c3}$ is expressed in general as follows:

$$V_{BE3} = V_o \log_2 I_{c3} + V_1 \tag{1}$$

This formula shows that when the base voltage $V_{VE3}$ undergoes a change by $V_o$, the collector current $I_{c3}$ doubles and for a change of one step (namely, 1EV) of the exposure time, when the memorized voltage of memory condenser $C_1$ is changed $V_o$ by $V_o$ to the line form an inverse logarithmic conversion can be applied, and as described above composite photoconductive element $R_o$ and fixed resistance $R_5$ are connected in series to each other so that the output voltage of terminal a of the connection point may be changed $V_o$ by $V_o$ for one step change of the illuminance on the light receiving surface.

$V_o$, $V_1$ in formula (1) are a coefficient of transistor $Tr_3$ and change in accordance with the temperature respectively, and for the temperature rise $V_o$ changes positively and $V_1$ changes netatively.

Figure 6:
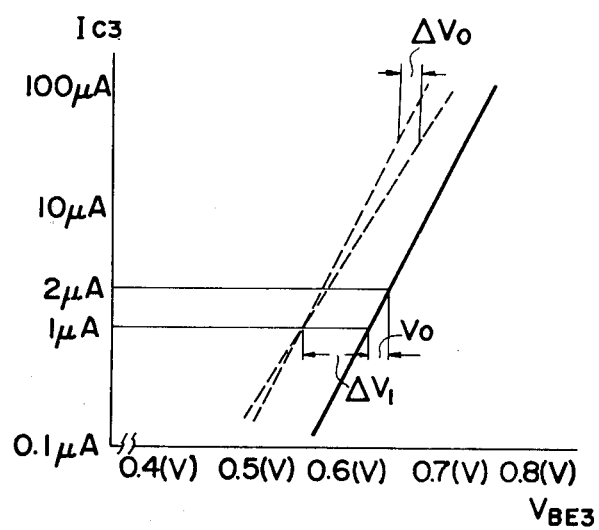
FIG. 6 is a diagram showing the relation between the base voltage and the collector current of the transistor for the inverse logarithmic conversion to the temperature change.

By this reason, with the progress of the temperature rise the relation between the base voltage $V_{BE3}$ and the collector current $I_{c3}$ undergoes a change from the solid line to the dotted line in the diagram of FIG. 6.

On the contrary, in order to compensate the temperature change of the transistor hitherto a diode has been proposed to put to use, however, the temperature compensation effected by the diode is able to be moved in parallel like the chain line shown in the diagram of FIG. 6 but it is impossible to compensate its grade, that is, as to formula (1) it is possible to compensate the temperature change of $V_1$ but it is impossible to compensate the temperature change of $V_o$. Therefore, to carry out the temperature compensation for transistor $Tr_3$ for the inverse logarithmic conversion by means of a diode can not compensate covering a wide change extent of the collector current, and a considerable error comes out, and accordingly it is impossible to put to practical use in the respect of precision.

In formula (1), provided changes of $V_o$, $V_1$ to temperature change $\Delta t$ are respectively $\Delta V_o$, $\Delta V_1$, change $\Delta V_{BE3}$ of the base voltage with a view in order not to change the collector current $I_{c3}$ is as follows:

$$\Delta V_{BE3} = \Delta V_o \log_2 I_{c3} + \Delta V_1 \tag{2}$$

Therefore, when the output voltage of terminal a undergoes a change by $\Delta V_{BE3}$ to satisy formula (2) to temperature change $\Delta t$, even if the temperature undergoes a change by $\Delta t$ the collector current $I_{c3}$ of transistor $Tr_3$ does not undergo a change, so that an error which is not negligible in the inverse logarithmic conversion process for the temperature change is compensated.

As described above, transistor $Tr_2$ for the temperature compensation is given the same characteristic as that of transistor $Tr_3$ for the inverse logarithmic conversion, so that provided the collector current of transistor $Tr_2$ for the temperature compensation is $I_{c2}$, the base current $V_{BE2}$ of transistor $Tr_2$ is as follows:

$$V_{BE2} = V_o \log_2 I_{c2} + V_1$$

And, provided the difference between the base voltage of transistor $Tr_2$ for the temperature compensation and the output voltage of contact a is $V_a'$, and bias resistance $R_4'$ connected between the collector and the base of transistor $Tr_2$ for the temperature compensation in FIG. 1 is not so large and the collector voltage is within the limit not saturated, $V_a' = \alpha IC_2$ is attained and $V_a'$ is proportional to the collector current $I_{c2}$, and in the aforementioned formula $\alpha$ is a proportional constant including $R_4'$, $R_4$, $R_o$, $R_5$ and expressed as follows:

That is, in $I_{c2}$, provided the current running to the $R_4$ side is $i_1$ and the current running to the $R_o$ side is $i_2$, $(R_4 + R_4') i_1 = (R_o + R_5) i_2, I_{c2} = i_1 + i_2(R_4 + R_4')$
$(I_{c2} - i_2) = (R_o + R_5) i_2$ Therefore, $$i_2 = \frac{(R_4 + R_4') I_{c2}}{R_o + R_5 + R_4 + R_4'}$$

And, making use of $$V_a' = - R_4' i_1 + R_5 i_2 = R_4' i_2 + R_5 i_2 - R_4' I_{c2}$$

as the results, $$V_a' = \left( \frac{(R_4' + R_5) + (R_4 + R_4')}{R_o + R_5 + R_4 + R_4'} - R_4' \right) I_{c2}$$

$$V_a' = \frac{R_4 R_5 - R_o R_4'}{R_o + R_5 + R_4 + R_4'} I_{c2}$$

Therefore, $$\alpha = \frac{R_4 R_5 - R_o R_4'}{R_o + R_5 + R_4 + R_4'}$$

Therefore, the output voltage $V_a$ of contact a is as follows:

$V_a = R_6 I_{c2} + V_{BE2} + V_a' = R_6 I_{c2} + V_o \log_2 I_{c2} + V_1 \alpha I_{c2}$ Change $\Delta V_a$ of the output voltage of contact a to the temperature change $\Delta t$ is as follows:

$\Delta V_a = R_6 \Delta I_{c2} + \Delta V_o \log_2 I_{c2} + V_o \Delta I_{c2}/I_{c2} \log_e 2 + \Delta V_1 + \alpha \Delta I_{c2}$ Whereas, $V_o 1/I_{c2} \log 2$ is small as compared with other coefficients and negligible, and it is possible to effect this temperature compensation by means of thermister $R_{14}$ connected to variable resistance $V_6$ and fixed resistance $R_{13}$, so that $\Delta V_a = R_6 \Delta I_{c2} + \Delta V_o \log_2 I_{c2} + \Delta V_1 + \alpha \Delta I_{c2}$ As described above, when in $\Delta V_a = \Delta V_{BE3}$, even if the temperature undergoes a change by $\Delta t$ the collector current $I_{c3}$ of transistor $Tr 3$ for the inverse logarithmic conversion does not undergo a change, so that the temperature compensation for the inverse logarithmic conversion process is enough effected and the exact automatic exposure time can be obtained.

Change $\Delta I_{c2}$ of the collector current of transistor $Tr_2$ for the temperature compensation in order to be $\Delta V_a = \Delta V_{BE3}$ is given the following relation:

$R_6 \Delta I_{c2} + \Delta V_o \log_2 I_{c2} + \Delta V_1 + \alpha \Delta I_{c2} = \Delta V_o \log_2 i + \Delta V_1$
$(R_6 + \alpha) \Delta I_{c2} = \Delta V_o \log_2 (I_{c3}/I_{c2})$  (3)

As shown in the aforementioned formula, the temperature change $\Delta V_1$ of coefficient $V_1$ of transistor $Tr_3$ for the inverse logarithmic conversion is compensated by the temperature change $(\Delta V_o \log I_{c2} + \Delta V_1)$ of the bias of the output terminal.

And, $V_{BE3} = V_a$, therefore, $V_o \log_2 I_{c3} + V_1 = R_6 I_{c2} + V_o \log_2 I_{c2} + V_1 +$ $\alpha I_{c2} \log_2 (\frac{I_{c3}}{I_{c2}}) = \frac{(R_6 + \alpha)}{V_o} I_{c2}$ From formula (3)

$$(R_6 + \alpha) \Delta I_{c2} = \Delta V_o \frac{(R_6 + \alpha)}{V_o} I_{c2} \quad (4)$$

$$\frac{\Delta V_o}{V_o} = \frac{\Delta I_{c2}}{I_{c2}}$$

Therefore, when the temperature change of the collector current $I_{c2}$ of transistor $Tr_2$ for the temperature compensation satisfies formula (4), not only the temperature change of coefficient $V_1$ of transistor $Tr_3$ for the inverse logarithmic conversion but also the temperature change of $V_o$ is compensated. The temperature change of the collector current $I_{c2}$ of transistor $Tr_2$ for the temperature compensation is carried out making use of the temperature change of the base voltage $V_{BE1}$ of constant-current transistor $Tr_1$.

Provided the voltage of point d divided by resistances $R_1$, $R_2$ is $V_d$, the current for running to resistance $R_3$ runs almost all to the collector of transistor $Tr_1$ and this current becomes the collector current $I_{c2}$ of transistor $Tr_2$, therefore, $R_3 I_{c2} + V_{BE1} = V_d$, Whereas, $V_d$ does not undergo a temperature change, so that when the temperature undergoes a change by $\Delta t$ change $\Delta I_{c2}$ of the collector current $I_{c2}$ is as follows:

$R_3 \Delta I_{c2} + \Delta V_{BE1} = 0$ $\Delta I_{c2} = - \frac{\Delta V_{BE1}}{R_3}$ $\frac{\Delta I_{c2}}{I_{c2}} = \frac{- R_3 \Delta V_{BE1}}{(V_d - V_{BE1}) R_3} = \frac{\Delta V_{BE1}}{V_{BE1} - V_d}$ Therefore, from formula (4)

$$\frac{\Delta V_o}{V_o} = \frac{\Delta I_{c2}}{I_{c2}} = \frac{\Delta V_{BE1}}{V_{BE1} - V_d} \quad (5)$$

When the temperature undergoes a change by $\Delta t$, by fixing resistances $R_1$, $R_2$ so that the temperature $\Delta V_o$ of coefficient $V_o$ of transistor $Tr_3$ for the inverse logarithmic conversion may get to be $V_d$ for satisfying formula (5), the temperature compensation of coefficients $V_o$, $V_1$ of transistor $Tr_3$ for the inverse logarithmic conversion can be effected, and the high precision automatic exposure time control can be carried out.

Variable resistance $R_6$ is a resistance for converting the setting diaphragm value and the film sensitivity as described above, and by increasing or decreasing both ends voltage $R_6 I_{c2}$ of said variable resistance $R_6 V_o$ by $V_o$ into the line form the setting diaphragm value or the film sensitivity can be changed by one step, and at the same time, when the collector current of temperature compensation transistor $Tr_2$ undergoes a temperature change for satisfying formula (4), formula (4) does not include $R_o$, $R_6$ so that the temperature change of transistor $Tr_3$ for the inverse logarithmic conversion can be compensated continuously to an optional value of $R_6$, $R_o$, therefore, the both ends bias voltage of variable resistance $R_6$ for converting the setting diaphragm value and the film sensitivity effects the temperature compensation of transistor $Tr_3$ for the inverse logarithmic conversion to the brightness of an object, and the conversion of the setting diaphragm value and the film sensitivity can be carried out.

As described hereinbefore, in the present invention the portion for producing the output voltage proportional to the logarithmic value of the illuminance on the light receiving surface of the photoconductive element and the portion for converting the setting diaphragm value and the film sensitivity are connected in series to each other and connected to one and the same power source, and at the same time the photographical operation is effected to them and through the collector current $I_{c2}$ of temperature compensation transistor $Tr_2$ the temperature compensation is effected to the optional rightness, the setting diaphragm, and the film sensitivity so that it is possible to effect the temperature compensation at the same time and the high precision automatic control for the exposure time can be effected covering all sphere of the brightness of an object in a wide range.

Next, when electromagnet coil M is excited a large current runs thereto, so that the voltage undergoes broadly a change as well known, therefore, when electromagnet coil M operates before the shutter is operated the power source voltage undergoes a change and accordingly an error of the exposure time comes out on account of variation of the trigger level of the Schmidt circuit. However, in the present invention, in order to compensate said error resistances $R_7$, $R_8$ for giving the bias voltage to memory condenser $C_1$ are provided.

Provided the amplification rate of transistor $Tr_5$ is $\beta$, trigger voltage $V_T$ of the Schmidt trigger circuit is as follows:

$$V_T = \beta R_9/\beta R_9 + R_{10} V = B \cdot V \tag{6}$$

(V is the power source voltage)

After switch $S_2$ shuts off terminal a and memorizes, just as main switch $S_3$ is electrified electromagnet coil M is exited and a large current runs, so that power source voltage V undergoes broadly a change to drop and trigger voltage $V_T$ drops in proportion to power source voltage V, and thereby an error is made. In order to compensate this error resistances $R_7$, $R_8$ are provided to give the bias to memory condenser $C_1$.

Provided the memory voltage of condenser $C_1$ is $V_c$, the power source voltage is V, and the voltage of bias resistance $R_8$ proportional to V is XV, $$V_{BE3} = V_o \log_2 I_{c3} + V_1 = V_c + XV \tag{7}$$

And, provided the capacity of condenser $C_2$ is $C_2$ and the time required for condenser $C_2$ to gets to the trigger voltage is T, $$C_2 V_T = I_{c3} T \tag{8}$$

And thus, change of $V_T$ to change of power source voltage V is as follows from formula (6):

$$\Delta V_T = \frac{\beta R_9}{\beta R_9 + R_{10}} \Delta V = B \cdot \Delta V$$

Electromagnet coil M operates and the power source voltage undergoes a change by $\Delta V$, and accordingly when trigger voltage $V_T$ undergoes a change by $\Delta V_T$, change of $I_{c3}$ for fixing the exposure time T is as follows from formula (8):

$$\Delta I_{c3} = \frac{C_2 \Delta V_T}{T} = \frac{C_2 \cdot B \cdot \Delta V}{T} \tag{9}$$

and from formula (7)

$$\frac{V_o \Delta I_{c3}}{I_{c3} \cdot \log_e 2} = X \Delta V \tag{10}$$

Therefore, bias voltage XV of memory condenser $C_1$ for which change of the collector current of transistor $Tr_3$ at the time when the power source voltage undergoes a change by $\Delta V$ satisfies formula (9) is as follows:

$$\frac{C_2 \cdot B \cdot \Delta V \cdot V_o}{I_{c3} \cdot T \cdot \log_e 2} = X \Delta V$$

Therefore, making use of formulas (6), (8), $$I_{c3} T = \frac{V_o \cdot C_2 \cdot B}{X \log_e 2} = C_2 V_T = C_2 BV \tag{11}$$

$$XV = \frac{V_o}{\log_e 2}$$

Therefore, after applying the bias for satisfying formula (11) to memory condenser $C_1$ and switch $S_2$ shuts off terminal a to memorize, just as main switch $S_3$ is electrified the variation of the trigger level in the Schmidt circuit caused by a broad variation of power source voltage V due to the exitation of electromagnet coil M is compensated by change of collector current $I_{c3}$ caused by change of the base voltage $V_{BE3}$ of transistor $Tr_3$ due to the bias for satisfying formula (11), and the exact exposure time can be obtained.

Figure 7:
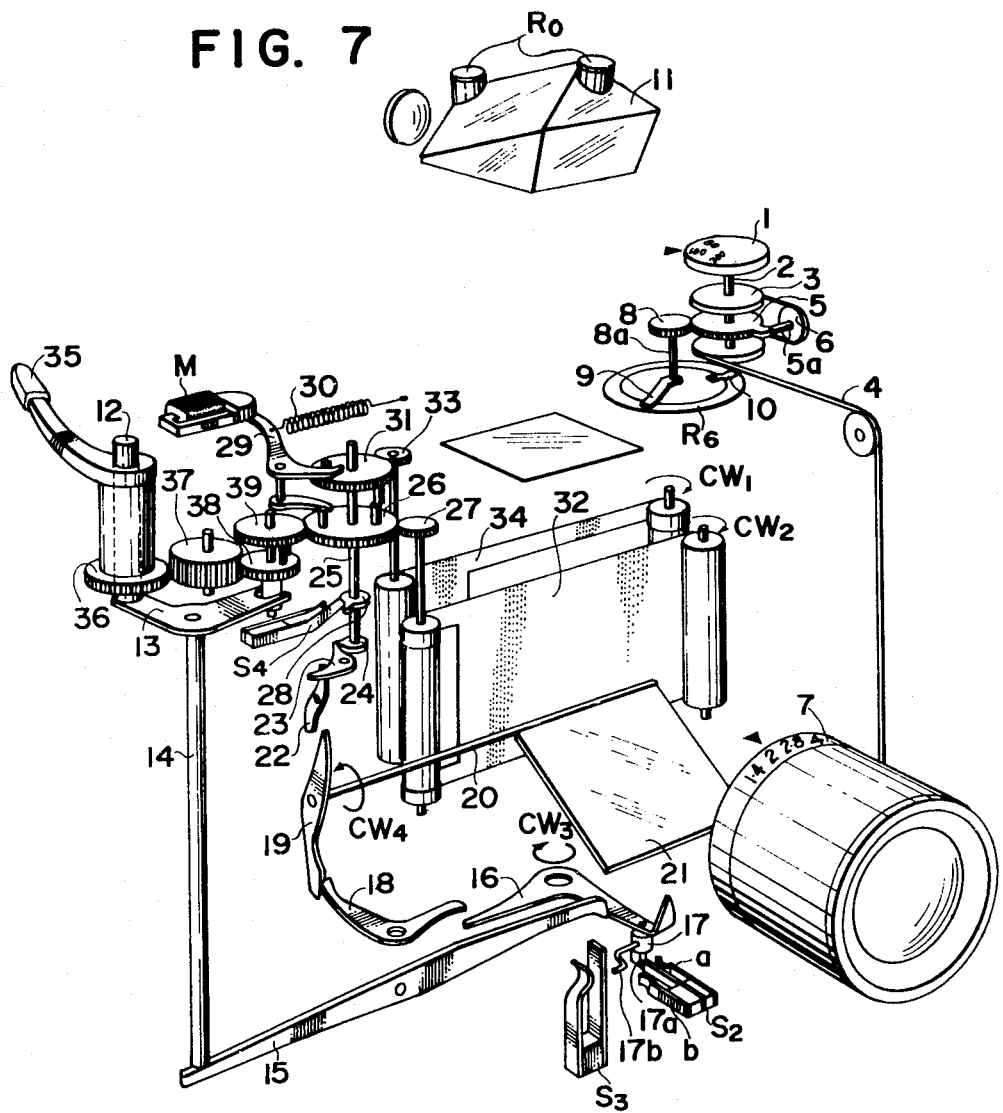
FIG. 7 is a perspective view of the exposure time control device making use of the control circuit shown in FIG. 1, in said embodiment.

FIG. 7 is a perspective view showing the shutter mechanism in a "through the lens" photometric type focal plane single reflex camera in the case of that the exposure time control circuit shown in FIG. 1 is applied to said camera, and the essential portions of an embodiment in the mechanical interlocking relation with the electromagnet, resistors, switches, etc. in the circuit in accordance with the present invention.

Interlocking wire 4 fixed on its one end to pulley 3 connected by axle 2 to film sensitivity setting dial 1 provided on the camera body so as to rotate in a body with said dial 1 is fixed on its other end to diaphragm setting ring 7 of the lens barrel via pulley 6 pivoted on arm portion 5a projecting in the radial direction from gear 5 fitting loosely on said axle 2. And, slide brush 9 provided on insulating axle 8a for gear 8 meshed with said gear 5 is adapted to slide on variable resistance $R_6$.

Therefore, just as the film sensitivity is set up by means of film sensitivity setting dial 1 and the diaphragm value is set up by means of diaphragm setting ring 7, said slide brush 9 slides on variable resistance $R_6$ so as to get the value corresponding to the setting film sensitivity and the setting diaphragm value. Said brush 10 is a stationary brush.

When the camera is put to use electric power source switch $S_1$ not shown in FIG. 7 is put in the conductive state. Therefore, the circuit shown in FIG. 1 is in the photometric state and ammeter A not shown in the drawing is in indicating the exposure time.

Photoconductive element $R_o$ is provided on pentagonal prism 11 and its composite photoconductive element $R_o$ effects the photometry actually.

Now, just as shutter button 12 is pushed interlocking lever 13 is pushed down and lever 15 is turned counterclockwise by interlocking rod 14 to disengage from switch lever 16 having the turning tendency to the direction shown by arrow $CW_3$. Thereupon, pin 17a for insulating member 17 for changing over the switch fixed to said switch lever 16 changes over switch $S_2$ from contact a to contact b and after switch $S_2$ shuts off contact a pin 17b for insulating member 17 closes main switch $S_3$ to exite electromagnet coil M.

After main switch $S_3$ is electrified, switch lever 16 turns mirror lever 19 to the direction shown by arrow $CW_4$ through intermediate lever 18 and also turns reflector 21 to the same direction through axle 20. Therefore, through the turning of said reflector 21 the photometric state is changed to the photographing state and the quantity of light incoming to photoconductive element $R_o$ is decreased gradually, however, switch $S_2$ is already changed over from contact a to contact b so that the resistance value of composite photoconductive element $R_o$ under the photometric state is memorized.

In the final process, mirror lever 19 engages with release lever 22 to turn it and the pawl of opening screen restraining lever 23 disengage from restraining plate 24, and restraining plate 24 turns together with the opening screen axle having the turning tendency to the direction shown by arrow $CW_2$ via axle 25, and gears 26, 27 and opening screen 32 starts to open the shutter. And at the same time, protrusion 28 fixed to axle 25 turns counterclockwise to open trigger switch $S_4$ for condenser $C_2$ so that said condenser $C_2$ is charged.

However, the closing screen is in being checked against travelling by closing screen restraining lever 29 attracted by electromagnet coil M. Just as the voltage of condenser $C_2$ gets to the trigger voltage $V_T$, electromagnet coil M is demagnetized and closing screen restraining lever 29 turns clockwise through spring 30 so as not to engage lever 29 with pin 31a and gear 31 becomes turnable so that shutter closing screen 34 starts to travel via gear 33 to close the shutter.

Just as winding lever 35 is turned cunterclockwise the film not shown in the drawing is wound and at the same time gear 26 is turned clockwise via gears 36, 37, 38, 39 formed in a body with said winding lever 35, and when restraining plate 24 formed in a body with gear 26 engages with the pawl of opening screen restraining lever 23 the shutter charge is finished.

Since the present invention is formed as described hereinbefore, the memory condenser is in memorizing the voltage proportional to the logarithmic value of the exposure time so that it is possible to memorize the voltage covering all sphere of the brightness of an object in a wide range, and in addition as described above it is easy to operate the output voltage proportional to the logarithmic value of the illuminance on the light receiving surface of the composite photoconductive element and the voltage for converting the setting diaphragm value and the film sensitivity, and it is possible to effect the temperature compensation at the same time to these lightness, setting diaphragm value, and film sensitivity and that by carrying out the temperature compensation of transistor $Tr_3$ for the inverse logarithmic conversion covering a wide extent of the collector current $IC_3$ of said transistor $Tr_3$ it is possible to remove an error which is not negligible in the inverse logarithmic conversion process, and besides an error of the exposure time control caused by a broad variation of the power source voltage due to the exitation of electromagnet coil M can be compensated as well.

Figure 8:
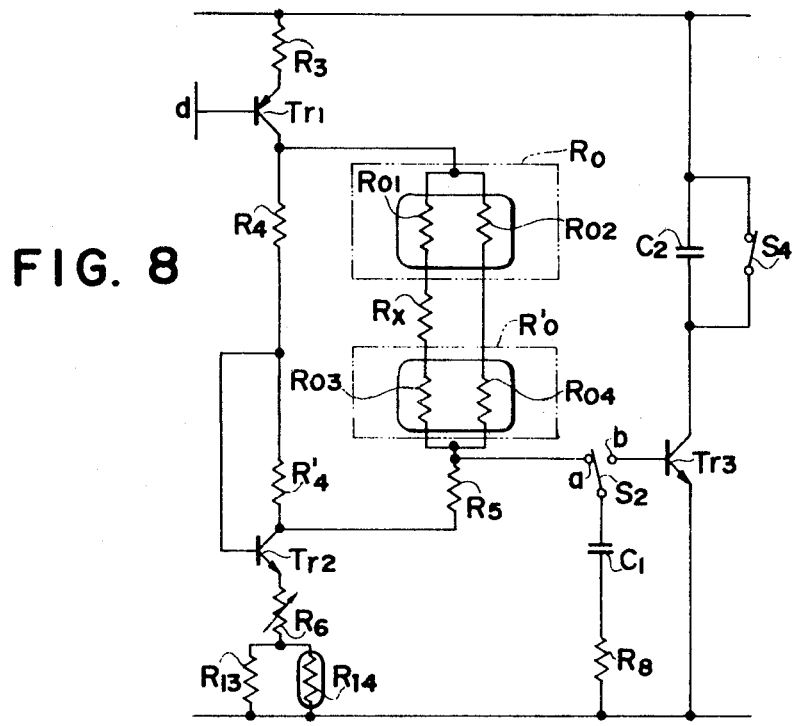
FIG. 8 is a partially enlarged view of the control circuit of the exposure time control device of another embodiment in accordance of the present invention.
Figure 9:
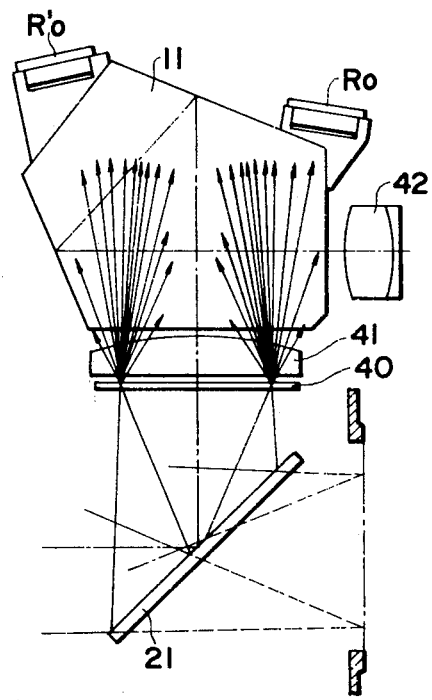
FIG. 9 is a side view showing the arrangement of the composite photoconductive element in said embodiment.

FIG. 8 is a partial circuit diagram of another embodiment in accordance with the present invention, wherein the respect differing from the embodiment shown in FIG. 1 is that composite photoconductive elements $R_o$, $R_o'$ are directly connected. Said composite photoconductive elements $R_o$, $R_o'$ are respectively provided in the separate position on pentagonal prism 11 as shown in FIG. 9. The light rays past through the objective lens are reflected by reflector 21 and come to focusing screen 40, and are diffused hereby and through condenser lens 41, pentagonal prism 11, and eye piece 42 the focussing image can be observed. And at the same time, a portion of the diffusion light rays come to composite photoconductive elements $R_o$, $R_o'$ and the light rays past through the objective lens are measured, however, composite photoconductive elements $R_o$, $R_o'$ disposed as shown in FIG. 9 are in measuring different portions of an object in dividing respectively.

Provided that the resistance-illuminance characteristics of two simple substance photoconductive elements are both identical and $R = KL^{-\gamma}$, in the case of the divisional photometry described above when the light rays in the illuminances of $L_1$ and $ML_1$ come into two photoconductive elements respectively the whole resistance value R ($L_1$, $ML_1$) of said two photoconductive elements connected in series is as follows:

$$R(L_1, ML_1) = K\{L_1^{-\gamma} + (ML_1)^{-\gamma}\} = KL_1^{-\gamma}(1 + M^{-\gamma})$$

And, when light rays of $M'L_1$ come into the illuminance equivalent to two photoconductive elements the resistance value $R(M'L_1, M'L_1)$ of the series connected body is as follows:

$$R(M'L_1, M'L_1) = 2K(M'L_1)^{-\gamma} = 2KM'^{-\gamma}L_1^{-\gamma} \tag{12}$$

Therefore, $M' = M'_k \left( \text{wherein } M'_k = \dfrac{1 + M^{-\gamma}}{2} \right)$ And, when this is satisfied, $$R(L, ML_1) = R(M'L_1, M'L_1)$$

In this manner, it is well known that by connecting photoconductive elements for doing divisional photometry in series and averaging objects different in the brightness ratio so as to satisfy formula (12), the photometry of good probability can be effected which turns to the proper exposure. In this case, especially when in $\gamma = 0.62$ it has been reported that the probability to turn to the proper exposure is the largest.

Then, as to the series connected body of composite photoconductive elements $R_o$, $R_o'$ as shown in FIG. 8, the illuminance-resistance characteristics of elements $R_{o1}$, $R_{o2}$ for constituting composite photoconductive element $R_o$ and elements $R_{o3}$, $R_{o4}$ for constituting composite photoconductive element $R_o'$, as seen in FIG. 3, satisfy the following formulas:

$$R_{o1} = R_{o3} = K_1 L^{-\gamma}, R_{o2} = R_{o4} = K_2 L^{-\gamma}$$

When light rays in the illuminances of $L_1$, $ML_1$ come into said composite photoconductive elements $R_o$, $R_o'$ respectively the resistance values $R'(L_1, ML_1)$ of the series connected body is as follows:

$$R'(L_1, ML_1) = \frac{(R_{o1} + R_x + R_{o3})(R_{o2} + R_{o4})}{(R_{o1} + R_x + R_{o3}) + (R_{o2} + R_{o4})}$$

-continued
$$= \frac{[K_1\{L_1^{-\gamma} + (ML_1)^{-\gamma}\} + R_x] \cdot K_2\{L_1^{-\gamma} + (ML_1)^{-\gamma}\}}{K_1\{L_1^{-\gamma} + (ML_1)^{-\gamma}\} + K_2\{L_1^{-\gamma} + (ML_1)^{-\gamma}\} + R_x}$$

$$R'(L_1, ML_1) = \frac{\{K_1L_1^{-\gamma}(1 + M_1^{-\gamma}) R_x\} K_2L_1^{-\gamma}(1 + M^{-\gamma})}{K_1L_1^{-\gamma}(1 + M^{-\gamma}) - K_2L_1^{-\gamma}(1 + M^{-\gamma}) + R_x}$$ (5)

And, when light rays of M'L₁ come into in the illuminance equivalent to two composite photoconductive elements $R_o$, $R_o'$ the resistance value $R'(M'L_1, M'L_1)$ of said series connected body is as follows:

$$R'(M'L_1, M'L_1) = \frac{(R_{o1} + R_x + R_{o3}) \cdot (R_{o2} + R_{o4})}{(R_{o1} + R_x + R_{o3}) + (R_{o2} + R_{o4})}$$ (12)

$$= \frac{\{2K_1(M'L_1)^{-\gamma} + R_x\}\{2K_2(M'L_1)^{-\gamma}\}}{2K_1(M'L_1)^{-\gamma} + 2K_2(M'L_1)^{-\gamma} + R_x}$$

$$= \frac{(2K_1L_1^{-\gamma}M^{-\gamma} + R_x)(2K_2L_1^{-\gamma}M^{-\gamma})}{2K_1L_1^{-\gamma}M^{-\gamma} + 2K_2L_1^{-\gamma}M^{-\gamma} + R_x}$$

Therefore, $M' = M'_k$ {Wherein $(M'_k)^{-\gamma} = \frac{1 + M^{-\gamma}}{2}$ }

When this is satisfied it turns to $R'(L_1, ML_1) = R'(M'L_1, M'L_1)$.

And accordingly, the resistance value of the series connected body in the case of that light rays in the illuminances of $L_1$, $ML_1$ come into two composite photoconductive elements for doing divisional photometry as shown in FIG. 8 respectively turns to the resistance value in the case of that light rays in the equal illuminances of $M'_k$, $L_1$ come into composite photoconductive elements $R_o$, $R_o'$.

this fact shows that in the same way as the series connected body of two simple substance photoconductive elements for doing divisional photometry, the series connected body of two composite photoconductive elements for doing divisional photometry as shown in FIG. 8 is in averaging objects different in the brightness ratio so as to satisfy the same formula (12). Therefore, the series connected body of composite photoconductive elements shown in FIG. 8 becomes possible to do photometry of the good probability which turns to the proper exposure to objects different in the brightness ratio, in the same manner as in the series connected body of simple substance photoconductive elements for doing divisional photometry. Especially in the case of that γ of elements $R_{o1}$, $R_{o2}$, $R_{o3}$, $R_{o4}$ constituting composite photoconductive elements $R_o$, $R'_o$ is $\gamma = 0.6$, the photometry which probability to turn to the proper exposure is the best becomes possible.

We claim:

1. In an electric shutter control device for a single lens reflex camera having a light receptive element for receiving light through an objective lens of the camera, a light detecting circuit having said light receptive elements for generating an output voltage proportional to the logarithm of the light intensity incident on said light receptive element, means for storing said output voltage during operation of the shutter, a first transistor for detecting the voltage stored by said means for storing and for generating a current output, said current output being proportional to the antilogarithm of said stored voltage, means for integrating said current output, and means responsive to said integrated current for initiating closing of the shutter after a time interval determined by said integrated current, the improvement wherein said light detecting circuit further has an output resistance serially connected with said light receptive element and a resistance shunting said serially connected light receptive element and said output resistor, said output voltage being generated at the junction point of said output resistance and said light receptive element, and a second transistor having substantially the same electric and temperature characteristics as said first transistor and further having a collector connected to one terminal of the parallel combination of said shunting resistance and said serially connected light receptive element and said output resistance, and a base connected to said shunting resistance to be biased thereby, and a third transistor for supplying constant current to the collector of said second transistor whereby said second transistor compensates for variations in said integrated current due to changes in temperature.

2. An exposure control device as set forth in claim 1, wherein the temperature characteristic of the collector current of said second transistor is substantially equal to the temperature characteristic of the collector current of said first transistor, whereby said output voltage is compensated in accordance with the formula $\Delta V_0/V_0 = \Delta I_{c2}/I_{c2}$, wherein $V_0$ is said output voltage, $\Delta V_0$ is the change in said output voltage, $\Delta I_{c2}$ is the change in collector current of said second transistor, and $I_{c2}$ is the collector current of said second transistor.

3. An exposure control device as set forth in claim 2, further comprising means for generating constant current including said third transistor, a voltage divider circuit having a third and a fourth resistance for biasing said third transistor, and the respective resistances of said third and fourth resistances are such that the temperature characteristic of the collector current of said first transistor is substantially equal to the temperature change characteristic of the voltage between the base and the emitter of said third transistor in accordance with the formula $\Delta I_{c2}/I_{c2} = \Delta V_{BE1}/V_{BE1} - V_d$, wherein $V_{BE1}$ and $\Delta V_{BE1}$ are the base-to-emitter voltage of said third transistor and $V_d$ is the voltage at the junction of said third and fourth resistances.

4. An electric shutter control device as in claim 1 further comprising means for varying said constant current in dependence upon temperature changes in the surroundings in accordance with the following formula: $\Delta i = \Delta V_0 V_0$ wherein $\Delta i$ is the change in said constant current with temperature, $\Delta V_0$ is the change of $V_0$ with temperature, $V_0$ is defined by $V_o = V_{BE2} - V_1/\log_2 I_{c2}$ and wherein $V_{BE2}$ is the base-to-emitter voltage of said second transistor, $I_{c2}$ is the collector current of said second transistor, $V_0$ and $V_1$ are the coefficients showing the relationship between base-emitter voltage and collector current of a transistor, which coefficients change with changes in temperature.

5. An electric shutter control device as in claim 1 further comprising biasing means including a variable resistor connected in series with the emitter of said second transistor for generating additional voltage to be added to the output voltage of said light detecting circuit, and means for adjusting said variable resistor in accordance with setting of a value of film sensitivity.

6. An exposure control device as set forth in claim 5, further comprising diaphragm aperture setting means and wherein the resistance value of said biasing means is also varied in accordance with the setting of said diaphragm aperture setting means.

7. An electric shutter control device as set forth in claim 5, wherein said shunting resistance includes two resistances connected together and said second transistor base is connected to the junction of said two resistances.

8. In an electric shutter control device for a camera including light receptive means receiving scene light through an objective lens of the camera and generating a signal indicative of the light incident thereon, a light detecting circuit having said light receptive means and for generating an output voltage proportional to the logarithm of the light intensity incident on said light receptive means, means for storing said output voltage during shutter operation, means for timing the closing of the shutter in accordance with said stored voltage, said means for timing having an integrating capacitor and a first transistor coupled to said capacitor, the improvement comprising:

means for setting a value of film sensitivity;

means including a linearly variable resistor adjustable in accordance with the setting of said film sensitivity for generating an additinal voltage comprising part of said output voltage; and means for applying constant current to said variable resistor, and including a second transistor and a resistor connected to the emitter of said second transistor, the collector of said second transistor generating said constant current, said means for generating constant current further including means for generating an operating voltage between the base of said second transistor and the other terminal of said resistor, said constant current being changed in response to temperature changes in the surroundings in accordance with the following formula $\Delta i/i = \Delta V_0/V_0$ wherein $\Delta i$ is the change in said constant current with temperature, $\Delta V_0$ is the change of $V_0$ with temperature, $V_0$ is defined by $V_0 = V_{BE} - V_1/\log_2 I_c$ and wherein $V_{BE}$ is the base-emitter voltage of said first transistor, $I_c$ is the collector current of said first transistor, $V_0$ and $V_1$ are the coefficients showing the relationship between base-emitter voltage and collector current of said first transistor, which coefficients change with changes in temperature.

9. In an electric shutter control device for a photographic camera, a combination comprising:

a light measuring circuit including a light receptive element and means for generating an output voltage representative of light incident on said light receptive element;

means for storing said output voltage during a shutter operation;

means for determining duration of exposure in accordance with said output voltage and including a first transistor and an integrating capacitor connected to the output of said first transistor;

a second transistor for generating a biasing potential at the collector thereof in accordance with changes in temperature, said biasing potential being included in said output voltage for preventing temperature dependent changes in the output of said first transistor;

a resistor connected between the collector and the base of said second transistor;

means for generating a constant current i which is variable with changes in temperature as given by the following formula, $\Delta i/i = \Delta V_0/V_0$ wherein $\Delta i$ is the change in said constant current with temperature, $\Delta V_0$ is the change with temperature, $V_0$ is defined by $V_0 = V_{BE} - v_1/\log_2 I_c$ and wherein $V_{BE}$ is the base-to-emitter voltage of said first transistor, $I_c$ is the collector current of said first transistor, $V_0$ and $V_1$ are the coefficients showing the relationship between base-emitter voltage and collector current of said first transistor, which coefficients change with changes in temperature; and said means for generating constant current is connected to the collector of said second transistor, whereby the effect of temperature changes to the electrical characteristics of said first transistor is compensated by said second transistor.

10. An electric shutter control device as set forth in claim 9, further comprising variable resistor means connected between the emitter of said second transistor and the ground of said device.

11. An electric shutter control device as set forth in claim 9, further comprising means for setting a value of film sensitivity including a variable resistor connected to the emitter of said second transistor and adjustable in accordance with the film sensitivity setting.

* * * * *